US008076408B2

(12) United States Patent
Nakamura et al.

(10) Patent No.: US 8,076,408 B2
(45) Date of Patent: Dec. 13, 2011

(54) RADIATION RESISTANT COMPOSITION, WIRE AND CABLE

(75) Inventors: Yoshiaki Nakamura, Hitachi (JP); Masami Sorimachi, Hitachi (JP); Hitoshi Kimura, Hitachi (JP); Shigeki Matsuyama, Mito (JP)

(73) Assignee: Hitachi Cable, Ltd., Tokyo (JP)

( * ) Notice: Subject to any disclaimer, the term of this patent is extended or adjusted under 35 U.S.C. 154(b) by 36 days.

(21) Appl. No.: 12/643,135

(22) Filed: Dec. 21, 2009

(65) Prior Publication Data

US 2010/0155102 A1 Jun. 24, 2010

(30) Foreign Application Priority Data

Dec. 22, 2008 (JP) ................................ 2008-326041

(51) Int. Cl.
*C08K 5/00* (2006.01)
*C08L 41/00* (2006.01)

(52) U.S. Cl. ........................................ 524/515; 524/547

(58) Field of Classification Search ................... 524/515
See application file for complete search history.

(56) References Cited

U.S. PATENT DOCUMENTS

| | | | | |
|---|---|---|---|---|
| 6,103,808 | A * | 8/2000 | Hashimoto | 524/484 |
| 6,248,929 | B1 | 6/2001 | Kaimai et al. | |
| 2005/0009978 | A1* | 1/2005 | Weydert et al. | 524/474 |
| 2005/0023024 | A1* | 2/2005 | Nakatsukasa et al. | 174/68.1 |

FOREIGN PATENT DOCUMENTS

| | | | |
|---|---|---|---|
| JP | 2-227914 | A | 9/1990 |
| JP | 4-268350 | A | 9/1992 |
| JP | 8-96629 | | 4/1996 |
| JP | 2000-80208 | A | 3/2000 |
| JP | 2004-217804 | A | 8/2004 |
| JP | 2005-23296 | A | 1/2005 |
| JP | 2005-48129 | A | 2/2005 |

* cited by examiner

*Primary Examiner* — Ling Choi
*Assistant Examiner* — Hui Chin
(74) *Attorney, Agent, or Firm* — Foley & Lardner LLP

(57) ABSTRACT

A radiation resistant composition includes 100 parts by weight of a polymer, 5 to 80 parts by weight of an aromatic series process oil that a polycyclic aromatic (PCA) extract by an IP 346 method (DMSO extraction) is not more than 3% and an aromatic compound content is not less than 20% by a Kurtz analysis, and a radiation resistance imparting agent. The polymer is cross-linked or vulcanized. A wire or a cable includes an insulation and/or a sheath material including the radiation resistant composition.

11 Claims, 3 Drawing Sheets

RADIATION RESISTANT COMPOSITION, WIRE AND CABLE

The present application is based on Japanese Patent Application No. 2008-326041 filed on Dec. 22, 2008, the entire contents of which are incorporated herein by reference.

BACKGROUND OF THE INVENTION

1. Field of the Invention

The invention relates to a radiation resistant composition for nuclear power plant, in particular, to a cable insulator and/or a sheath material to which an aromatic series oil as a process oil and/or a radiation resistance imparting agent (anti-radiation agent) are/is added with an antioxidant and a radiation resistance is further imparted by a polymer blend.

2. Description of the Related Art

Currently, a cable insulator and/or a sheath material for nuclear facilities such as a nuclear power plant are/is formed of ethylene propylene rubber, polychloroprene rubber and polyethylene, and a method in which a process oil of aromatic series, etc., having a radioprotective effect or an antioxidant is added is generally used in order to impart radiation resistance (anti-radiation).

The aromatic series oil is used as an energy transfer type anti-radiation agent which absorbs radiation energy, and it can be added at a large amount since bleed does not occur. The antioxidant is used in combination of a first antioxidant for trapping/stabilizing a radical generated in a polymer with a second antioxidant which is peroxide decomposing type for decomposing peroxide into alcohol. A decrease in tensile properties and electrical properties, etc., due to radiation degradation can be suppressed by adding the above (e.g., see JP-A 4-268350, JP-A 2-227914 and JP-A 8-96629).

Furthermore, there has been proposed a radiation resistant polymer composition having a radioactive decay polymer added thereto and exhibiting moderate survivability of physical properties after radiation exposure (e.g., see JP-A 2005-48129).

Taking into consideration the case of LOCA (loss-of-coolant accident), nuclear power plants require a composition which withstands a radiation dose of about 760 kGy for a boiling water reactor (BWR) nuclear power plant and of about 2 MGy for a pressurized water reactor (PWR) nuclear power plant.

SUMMARY OF THE INVENTION

According to an EU directive (Commission Directive 97/69/EEC), the aromatic series oil added as an energy transfer type anti-radiation agent contains 3% or more of PCA amount having 3-7 aromatic rings extracted by DMSO (dimethyl sulfoxide) based on IP (Institute of Petroleum) 346 method, and exhibits carcinogenicity on human body. Therefore, it is not preferable to use such a substance for the environment and the safety.

On the other hand, a paraffinic oil and a napthenic oil of which PCA amount is 3% or less do not have good compatibility with the above-mentioned rubbers, especially with chlorinated rubber having a polarity, and may bleed out. In addition, since a content of the aromatic compound having an energy transfer effect on the radiation is low and there is no effect as the anti-radiation agent, there is a problem that physical properties and electrical properties of a rubber material are largely deteriorated due to radiation degradation.

In addition, although the moderate physical properties are exhibited after the radiation exposure, an addition of a large amount of the radioactive decay polymer is not preferable when considering the long-term safety.

Therefore, it is an object of the invention to provide a radiation resistant composition and a wire/cable which have low carcinogenicity and are excellent in physical properties, electrical properties, economic efficiency and handling properties as well as excellent in heat resistance and radiation resistance.

(1) According to one embodiment of the invention, a radiation resistant composition comprises:

100 parts by weight of a polymer;

5 to 80 parts by weight of an aromatic series process oil that a polycyclic aromatic (PCA) extract by an IP 346 method (DMSO extraction) is not more than 3% and an aromatic compound content is not less than 20% by a Kurtz analysis; and a radiation resistance imparting agent, wherein the polymer is cross-linked or vulcanized.

In the above embodiment (1), the following modifications and changes can be made.

(i) The aromatic series process oil comprises TDAE (treated distillate aromatics extracts) having an aniline point of not more than 90° C.

(ii) The polymer comprises 5 to 100 parts by weight of a first component polymer, and 50 to 0 parts by weight of a second component polymer, the first component polymer being cross-linked and the second component polymer being non-cross-linked.

(iii) The radiation resistance imparting agent comprises 2 to 30 parts by weight of an antioxidant.

(iv) The first component polymer comprises at least one of ethylene propylene rubber, polychloroprene rubber, chlorosulfonated polyethylene, chlorinated polyethylene and nitrile rubber, and the second component polymer comprises at least one of ethylene propylene rubber, chlorosulfonated polyethylene and chlorinated polyethylene.

(2) According to another embodiment of the invention, a wire comprises:

an insulation and/or a sheath material comprising the radiation resistant composition according to the above embodiment (1).

(3) According to another embodiment of the invention, a cable comprises:

an insulation and/or a sheath material comprising the radiation resistant composition according to the above embodiment (1).

POINTS OF THE INVENTION

According to one embodiment of the invention, a radiation resistant composition is designed such that it has low carcinogenicity and good compatibility with polymer, especially with rubber, by adding 5 to 80 parts by weight of the above-mentioned aromatic series process oil with respect to 100 parts by weight of polymer, and the aromatic compound content is increased to not less than 20% to sufficiently function as an anti-radiation agent. In addition, radiation resistance is further imparted by mixing the antioxidant, so that the composition can be suppressed in deterioration even after a large amount of radiation exposure.

BRIEF DESCRIPTION OF THE DRAWINGS

Next, the present invention will be explained in more detail in conjunction with appended drawings, wherein.

DESCRIPTION OF THE PREFERRED EMBODIMENTS

Figure 1:
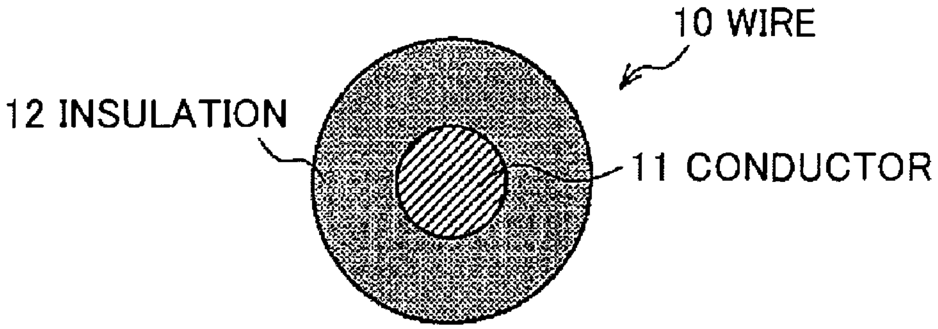
FIG. 1 is a lateral cross sectional view showing a wire in a preferred embodiment of the present invention.

A preferred embodiment of the invention will be explained hereinafter.

A radiation resistant composition in the present embodiment is formed by mixing and cross-linking or vulcanizing an antioxidant with an aromatic series process oil, in which PCA extraction by IP 346 method (DMSO extraction) is 3% or less and an aromatic compound content is 20% by Kurtz analysis, at a ratio of 5-80 parts by weight with respect to 100 parts by weight of polymer.

In general, an aromatic series process oil added to a polymer, especially to rubber, contains many aromatic compounds, which are deasphalted from residual oil of crude oil after atmospheric or vacuum distillation and are separated into each components by solvent extraction. However, the aromatic series oil as described above contains many PCA and has high carcinogenicity. Addition of paraffinic and napthenic process oils may be taken into consideration, however, the compatibility with rubber, especially with chlorinated rubber having a polarity, is not good and a bleed thus occurs. In addition, the content of the aromatic compound having an energy transfer effect on the radiation is low in the paraffinic and napthenic oils, and thus, it is not possible to obtain the anti-radiation effect.

As for the process oil, the residual oil of the crude oil after atmospheric or vacuum distillation is refined by one or a combination of two or more treatments of deasphalting, solvent extraction, dewaxing and hydrogenation.

Among such process oils, the aromatic series process oil which is treated such that the PCA extraction by the DMSO extraction of IP 346 method is 3% or less, polycyclic aromatic hydrocarbon (hereinafter, referred to as "PAH") shown in Table 1 which is regulated by EU Directive 76/769/EEC "Restrictions on the marketing and use of certain dangerous substances" is below the regulation value, the content of the aromatic compound (CA: a ring analysis value by Kurtz analysis, and an index of a ratio of carbon composing aromatic ring to the total amount of carbon) is 20% or more, and an aniline point is 90° C. or less, is used in the present embodiment. In addition, in the aromatic series process oil, the upper limit of the content of the aromatic compound is 50% and the lower limit of the aniline point is 4° C.

TABLE 1

| PAH (8 substances) | Structure | Regulation value |
|---|---|---|
| Benz[a]anthracene | 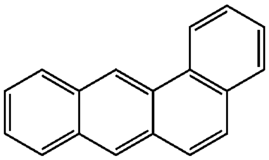 | The total contents of 8 substances should be 10 ppm or less. |
| Chrysene/Triphenylen | 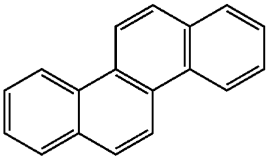 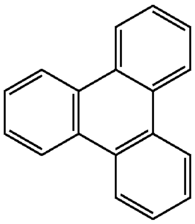 | Benzo[a]pyrene should be 1 ppm or less per unit. |
| Benzo[b]fluoranthene | | |
| Benzo[j]fluoranthene | 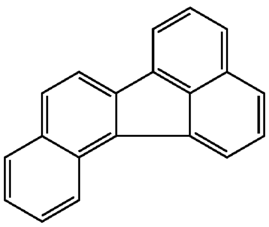 | |

TABLE 1-continued

| PAH (8 substances) | Structure | Regulation value |
|---|---|---|
| Benzo[k]fluoranthene | | |
| Benzo[e]pyrene | 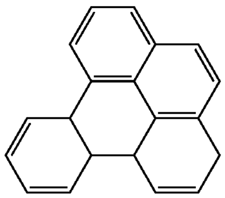 | |
| Benzo[a]pyrene | 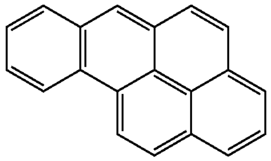 | |
| Dibenz[a, h]anthracene | 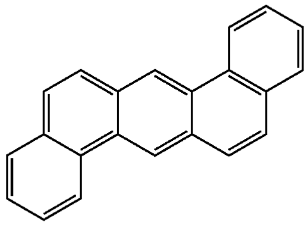 | |

When the content of the aromatic compound is less than 20%, the content of the aromatic compound having the energy transfer effect on the radiation is low and it is not possible to obtain the anti-radiation effect. In addition, the content of the aromatic compound is 50% or less in the most of the process oils sold as aromatic series oil for rubber.

The aniline point is one of parameters which shows the compatibility of the rubber with the oil. When the content of the aromatic compound is high, the aniline point is low. When the aniline point exceeds 90° C., the compatibility with polymer, especially with rubber, deteriorates. In addition, the most process oils sold as the aromatic series oil has an aniline point of 4° C. or more. In addition, the content of the aromatic compound by Kurtz analysis can be derived by the following method.

1) Viscosity gravity constant (VGC) is calculated from a kinetic viscosity and a density of the aromatic series process oil by using the formula (1).

2) Refractivity intercept (RI) is calculated from a density and a refractive index of the aromatic series process oil by using the formula (2).

Figure 5:
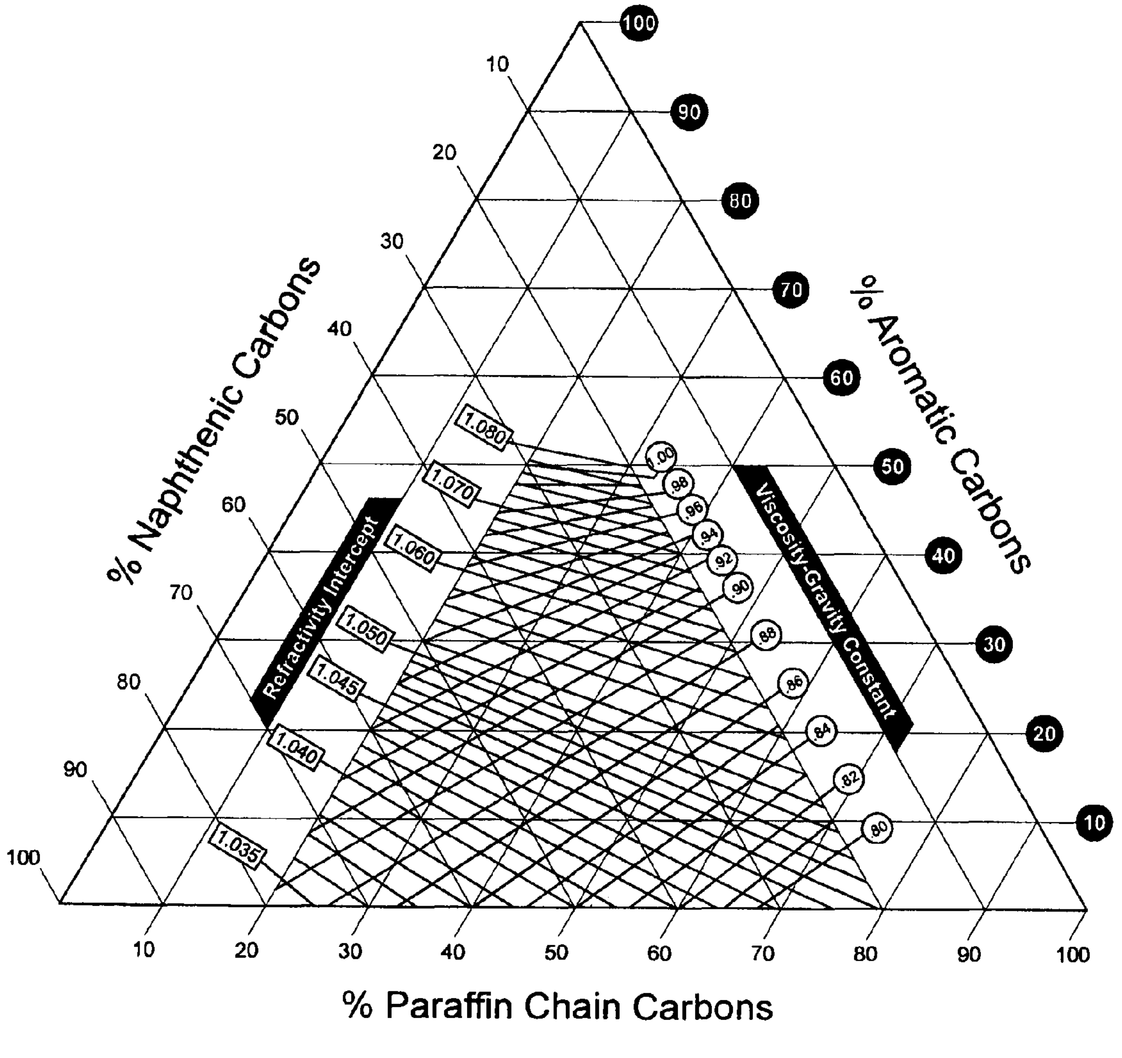
FIG. 5 is a diagram for retrieving a data of aromatic compound content (% aromatic carbons) by Kurtz analysis.

3) The content of the aromatic compound is derived by applying the calculated VGC and RI into a triangle graph drawn in FIG. 5.

$$VGC = \frac{G + 0.0887 - 0.776\,\text{loglog}(10V\text{-}4)}{1.082 - 0.72\,\text{loglog}(10V\text{-}4)} \tag{1}$$

G=a density at 60° F. (15.6° C.)

V=a kinetic viscosity at 100° F. (37.8° C.)

$$R = nd^{20} - (d/2) \tag{2}$$

$nd^{20}$=a refractive index at 20° C.

d=a density at 20° C.

Since the aromatic series oil used in the present embodiment has a low aniline point which is 90° C. or less, it has good compatibility with polymer, especially with rubber, and since the bleed does not occur even if a large amount is added, furthermore, the aromatic compound is contained a lot, there is an anti-radiation effect. Such a process oil includes, e.g., MES (mild extract solvate) or Hydro treated MES which is further hydrogenated, and TDAE (Treated Distillate Aromatics Extracts), etc. In general, TDAE contains more aromatic and less paraffin than MES. Thus, TDAE is more excellent in the radiation resistance. Furthermore, since TDAE has a higher viscosity-gravity constant (VGC) which has a close relation with essential properties of the oil and is excellent in the compatibility, the addition of the TDAE is especially preferable.

The blending amount of less than 5 parts by weight of the aromatic series process oil with respect to 100 parts by weight of polymer is too little and embrittlement of the material occurs after the radiation exposure, meanwhile the blending amount is too much when exceeding 80 parts by weight and the bleed out intensively occurs. The preferable blending amount is 5-50 parts by weight.

In order to impart further radiation resistance to the composition, an antioxidant is added as a radiation resistance imparting agent. One or a combination of two or more of phenolic antioxidants and/or amine antioxidants is added in order to trap/stabilize a radical generated in the polymer.

2-30 parts by weight of the antioxidant is preferably blended with respect to 100 parts by weight of the polymer. When the antioxidant is less than 2 parts by weight with respect to 100 parts by weight of the polymer, an obvious effect of further improving the radiation resistance by the antioxidant is not obtained, meanwhile over 30 parts by weight is not suitable because of generation of blooming and an economical aspect.

The phenolic antioxidant includes primary antioxidants which are respectively categorized into monophenol series, bisphenol series and polyphenol series. For the monophenol antioxidant, it is possible to use, e.g., 2,2'-di-tert-butyl-4-methylphenol, 2,6-di-tert-butyl-4-ethylphenol or mono-(α-methylbenzyl), etc. Meanwhile, for the bisphenol antioxidant, it is possible to use, e.g., 2,2'-methylenebis(4-methyl-6-tert-butylphenol), 2,2'-methylenebis(4-ethyl-6-tert-butylphenol), 4,4'-butylidene-bis(3-methyl-6-tert-butylphenol), 4,4'-thiobis(3-methyl-6-tert-butylphenol), a butyl reaction product of p-cresol and dicyclopentadiene or di(α-methylbenzyl), etc. Furthermore, for the polyphenol antioxidant, it is possible to use, e.g., 2,5'-di-tert-butylhydroquinone, 2,5'-di-tert-amylhydroquinone or tri(α-methylbenzyl), etc.

As an amine antioxidant, it is possible to use a quinoline antioxidants and an aromatic secondary amine antioxidants. For the quinoline antioxidant, it is possible to use, e.g., 2,2,4-trimethyl-1,2-dihydroquinoline or 6-ethoxy-1,2-dihydro-2,2,4-trimethylquinoline, etc. For the aromatic secondary amine antioxidant, it is possible to use, e.g., phenyl-1-naphthylamine, alkylated diphenylamine, octyl diphenylamine, 4,4'-bis(α,α-dimethylbenzyl) diphenylamine, p-(p-toluenesulfonyl amido)-diphenylamine, N,N'-di-2-naphthyl-p-phenylenediamine, N,N'-diphenyl-p-phenylenediamine, N-phenyl-N-isopropyl-p-phenylenediamine, N-phenyl-N-(1,3-dimethylbutyl)-p-phenylenediamine or N-phenyl-N'-(3-methacryloyloxy-2-hydroxypropyl)-p-phenylenediamine, etc.

A sulfur antioxidant includes antioxidants which are respectively categorized into benzimidazole series, dithiocarbamate series, thiourea series and organic thioacids. For the benzimidazole secondary antioxidant, it is possible to use, e.g., 2-mercaptobenzimidazole, 2-mercaptomethylbenzimidazole or 2-mercaptobenzimidazole zinc salt, etc. Meanwhile, for the dithiocarbamate antioxidant, it is possible to use, e.g., nickel diethyldithiocarbamate or nickel dibutyldithiocarbamate, etc. Furthermore, it is possible to use dilauryl thiodipropionate, etc, for the organic thioacid secondary antioxidant.

As for a phosphorus antioxidant, it is possible to use, e.g., Tris(nonylphenyl) phosphate, etc., as phosphorous acid series.

The inventors found that a polymer blend of a polymer formed by cross-linking and a non-cross-linked polymer is effective for further imparting the radiation resistance and the heat resistance to the composition. Particularly, the moderate physical properties were successfully imparted after the radiation exposure by adding the non-cross-linked polymer which is a non-cross-linked radiation crosslinked polymer to the cross-linked polymer which is a radiation crosslinked polymer formed by cross-linking. It should be noted that the above-mentioned radiation crosslinked polymer indicates a polymer in which the cross-link proceeds by the radiation used in the nuclear power plant.

The polymer composition consists of 100-50 parts by weight of the cross-linked polymer as a first component polymer and 0-50 parts by weight of the non-cross-linked polymer as a second component polymer. The first component polymer is at least one of cross-linked rubbers such as, e.g., ethylene propylene rubber, polychloroprene rubber, chlorosulfonated polyethylene, chlorinated polyethylene and nitrile rubber, and the second component polymer is at least one of non-cross-linked rubbers such as, e.g., ethylene propylene rubber, chlorinated polyethylene and chlorosulfonated polyethylene. The polymer composition is characterized in that the total of the first and second component polymers is 100 parts by weight.

Here, the cross-linked polymer is a polymer which is cross-linked by a cross-linking agent mixed thereto and in which the cross-linking agent can be effective if, during the cross-linking process, ionizing radiation is irradiated at an exposure dose of 1 kGy-2 MGy or heat treatment is performed at 140-200° C., meanwhile the non-cross-linked polymer is a polymer which is less likely to be cross-linked by the cross-linking agent mixed thereto and in which the cross-linking agent is not really effective even though, during the cross-linking process, ionizing radiation is irradiated at an exposure dose of 1 kGy-2 MGy or heat treatment is performed at 140-200° C. Even if both are blended and cross-linked, a cross-linked portion and a non-cross-linked portion are present.

When the both are blended, since the first component polymer is cross-linked by the cross-linking process but the second component polymer is less likely to be cross-linked even though the cross-linking process is performed, it is possible to produce a polymer formed of cross-linked component and non-cross-linked component.

The physical property remarkably deteriorated due to the radiation degradation is a breaking elongation and it is possible to obtain a moderate breaking elongation after the radiation exposure by adding the non-cross-linked radiation crosslinked polymer which is the second component polymer. Particularly, the amount of propylene in the ethylene propylene rubber of the second component polymer is preferably 50% or more. When the propylene content is large, the cross-link by the radiation does not proceed and it is possible to obtain the moderate physical properties even after the radiation exposure. In the radiation resistant composition in the present embodiment, since the radioactive decay polymer is not added but the non-cross-linked radiation crosslinked polymer is added, there is a low possibility of destruction of the polymer itself and it is excellent in the safety.

When the second component polymer exceeds 50 parts by weight, the physical properties are remarkably deteriorated as compared with the case of 50 parts by weight or less.

A combination of the first and second component polymers is not limited, however, from a consideration of the compatibility or the properties, particularly preferable combinations of the first component polymer/the second component polymer are ethylene propylene rubber/ethylene propylene rubber, polychloroprene rubber/chlorinated polyethylene, polychloroprene rubber/chlorosulfonated polyethylene, chlorosulfonated polyethylene/ethylene propylene rubber and chlorosulfonated polyethylene/chlorinated polyethylene. In contrast to the polychloroprene rubber alone, the combinations of polychloroprene rubber/chlorinated polyethylene and polychloroprene rubber/chlorosulfonated polyethylene improve not only the radiation resistance but also the heat resistance.

An additive agent such as a filler/reinforcing agent which is carbon black, silica, calcium carbonate, clay or calcined clay, etc., a lubricant which is stearic acid or wax, etc., a flame retardant which is halogen compound, metal hydroxide or antimony trioxide, etc., a halogen stabilizer which is lead compound or hydrotalcite, etc., and a vulcanization accelerator can be added to the radiation resistant composition in the present embodiment in a range not disturbing the objective thereof, and phthalate ester or trimellitic acid ester, etc., may be added as another process oil depending on the necessity.

The radiation resistant composition in the present embodiment is not intended to limit specifically the manufacturing method, and it can be manufactured by a well-known kneading method or vulcanizing/cross linking method.

Since the radiation resistant composition in the present embodiment has low carcinogenicity and good compatibility with polymer, especially with rubber, by adding 5-80 parts by weight of the above-mentioned aromatic series process oil with respect to 100 parts by weight of polymer, in addition, since the aromatic compound content is large such as 20% or more, an effect as an anti-radiation agent is sufficient.

In addition, according to the radiation resistant composition in the present embodiment, since the radiation resistance is further imparted by mixing the antioxidant, it is possible to suppress the deterioration of the composition even after a large amount of radiation exposure.

An example of the wire/cable in the present embodiment will be described as follows.

A wire 10 shown in FIG. 1 is a single-layer wire in which an insulation 12 formed of the above-mentioned radiation resistant composition is formed on an outer periphery of a conductor 11. The insulation 12 is formed by extrusion-coating.

Figure 2:
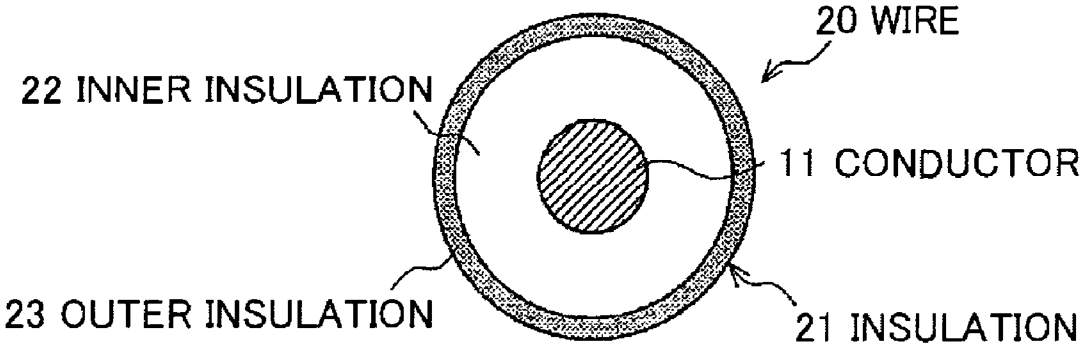
FIG. 2 is a lateral cross sectional view showing a wire in another embodiment of the invention.

A wire 20 shown in FIG. 2 is a two-layered wire in which an insulation 21 having a two-layered structure is formed on the outer periphery of the conductor 11. The insulation 21 is composed of an inner insulation 22 and an outer insulation 23 formed of the above-mentioned radiation resistant composition, and is formed by simultaneous extrusion-coating of the two layers.

Figure 3:
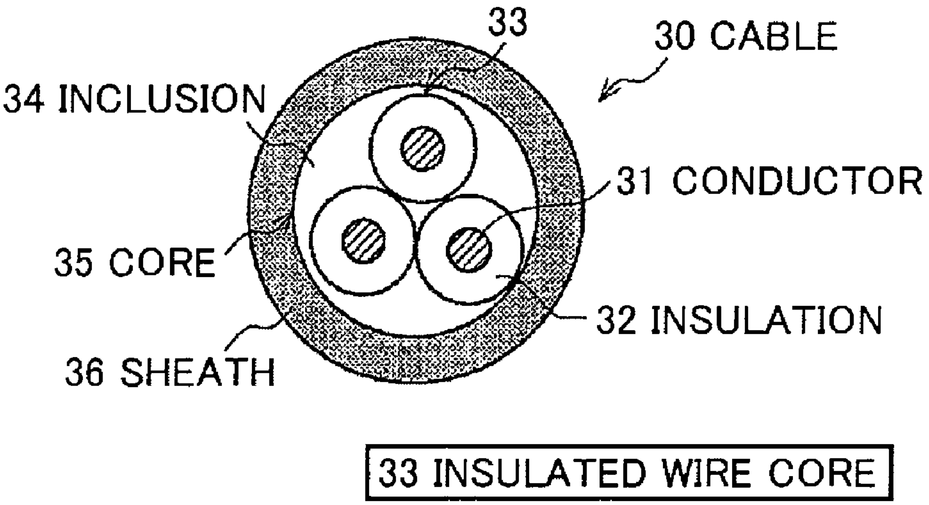
FIG. 3 is a lateral cross sectional view showing a cable in the embodiment of the invention.

In addition, a cable 30 shown in FIG. 3 is a single-layer cable in which an insulated wire core 33 is formed by forming an insulation 32 on an outer periphery of a conductor 31, a core 35 is formed by twisting plural (three in FIG. 3) insulated wire cores 33 together with an intermediate 34, and a sheath 36 formed of the above-mentioned radiation resistant composition is formed on the outer periphery of the core 35.

Figure 4:
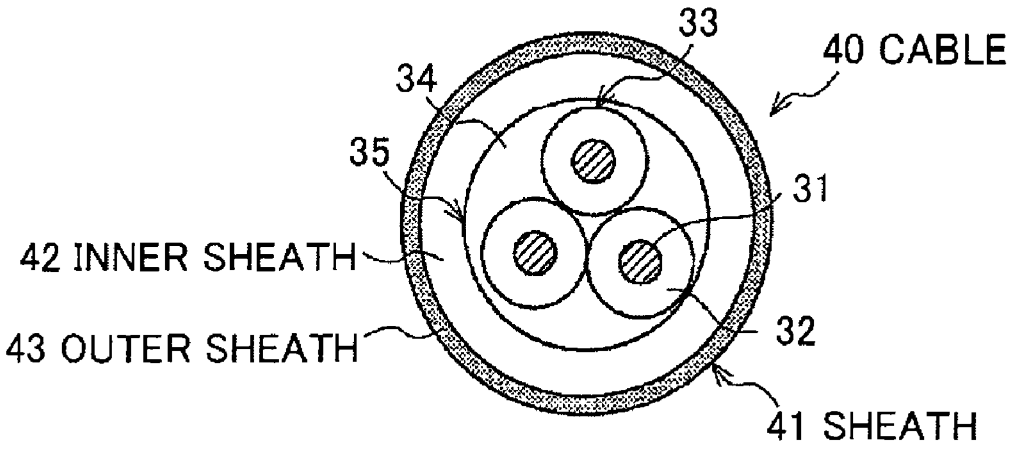
FIG. 4 is a lateral cross sectional view showing a cable in another embodiment of the invention.

A cable 40 shown in FIG. 4 is a two-layered cable in which a sheath 41 having a two-layered structure is formed on the outer periphery of the core 35 of FIG. 3. The sheath 41 is composed of an inner sheath 42 and an outer sheath 43 formed of the above-mentioned radiation resistant composition, and is formed by simultaneous extrusion-coating of the two layers.

As described above, since the insulation 12, the outer insulation 23, the sheath 36 and the outer sheath 43, which are the outermost layers, are formed of the above-mentioned radiation resistant composition, the wires 10, 20, or the cables 30, 40 have low carcinogenicity and are excellent in physical properties, electrical properties, economic efficiency and handling properties as well as excellent in heat resistance and radiation resistance.

Therefore, the wires 10, 20 and the cables 30, 40 are suitable for using in a nuclear power plant or an institute of nuclear research, etc.

Although single- and two-layer insulators or sheaths have been explained as an example in the above-mentioned embodiment, it is acceptable as long as the insulators or the sheaths have at least one layer and the outermost insulator and/or sheath are/is formed of the above-mentioned radiation resistant composition.

Kneading

Each specimen of Examples 1-10 and Comparative Examples 1-7 was kneaded with components shown in Table 2. The unit of the components in Table 2 is parts by weight of the blend (phr). The kneading was performed using an open roll.

Cross-Link or Vulcanization, and Sheet Formation

The cross-link or vulcanization and the sheet formation were performed by pressing. The cross-linking conditions were at 180° C. for 10 minutes in Examples 1, 2 and Comparative Examples 1, 2, at 145° C. for 40 minutes in Examples 3, 4 and Comparative Example 3, and at 150° C. for 30 minutes in Examples 5-10 and Comparative Examples 4-7. The sheet was formed 1 mm thick.

Tensile Test

The formed sheet was punched by dumbbell of size 4 and the tensile test was conducted at 500 mm/min using a tensile testing machine for measuring tensile strength and elongation.

Definition of Elongation

1. A benchmark is marked at a center portion (5 mm in width and 20 mm or more in length) of a dumbbell-shaped specimen piece (marker interval=$L_0$).

2. The specimen piece is pulled by the tensile testing machine. When the marker interval at the time of the breaking is $L_1$, the elongation $E_0$ is represented by the following formula:

$$E_0=\{(L_1-L_0)/L_0\}\times 100$$

Bleed Check

The occurrence of bleed was visually checked.

Carcinogenicity

It is assumed that the composition using a process oil having PCA amount of 3% or less extracted by IP 346 method (DMSO extraction) does not have carcinogenicity.

Exposure to Radiation

As for the irradiation of the radiation, γ-rays were irradiated using a $^{60}$Co possessed by Japan Atomic Energy Agency Takasaki institute. It was conducted at about 4 kGy/h of dose rate. The irradiation was conducted at 760 kGy of dose rate for Examples 5, 6 and Comparative Example 3 since the polychloroprene rubber is sensitive to the radiation, and was conducted at 2 MGy for the others.

Judgment of Acceptance/Rejection

The case of the elongation of 100% or more after the radiation exposure, no occurrence of bleed as well as no carcinogenicity is judged as "passed."

TABLE 2

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Components | First component polymer | (1) Ethylene propylene rubber | 100 | 50 | 100 | 100 | | | | | | |
| | | (2) Polychloroprene rubber | | | | | 80 | 50 | | | | |
| | | (3) Chlorosulfonated polyethylene | | | | | 20 | | 100 | 100 | 70 | 70 |
| | Second component polymer | (4) Ethylene propylene rubber | | 50 | | | | | | | 20 | |
| | | (5) Chlorinated polyethylene | | | | | | 50 | | | 10 | 30 |
| | Process Oil | (6) Paraffinic oil | | | | | | | | | | |
| | | (7) Aromatic series oil | | | | | | | | | | |
| | | (8) TDAE | 10 | 10 | 10 | 10 | 10 | 10 | 5 | 80 | 10 | 10 |

TABLE 2-continued

| | | | | | | | | | | | | |
|---|---|---|---|---|---|---|---|---|---|---|---|---|
| | Antioxidant | Amine antioxidant | 3 | 3 | 5 | 1 | 2 | 2 | 2 | 2 | 2 | 2 |
| | | Sulfur antioxidant | 5 | 5 | 10 | 1 | 2 | 2 | 2 | 2 | 2 | 2 |
| | Cross-linking agent | Dicumylperoxide | 3 | 3 | 3 | 3 | | | | | | |
| | | Red lead | | | | | 30 | 30 | 30 | 30 | 30 | 30 |
| | Filler | (9) Silica | | 5 | | | | 5 | | | | |
| | | Carbon black | 40 | 40 | 40 | 40 | 40 | 40 | 40 | 40 | 40 | 40 |
| | Cross-linking accelerator | Thyraum accelerator | | | | | 3 | 3 | 3 | 3 | 3 | 3 |
| Evaluation result | Tensile property (initial value) | Tensile strength (MPa) | 14.9 | 10.6 | 11.2 | 15.3 | 13.3 | 12.5 | 17.2 | 10.2 | 12.7 | 11.0 |
| | | Elongation (%) | 590 | 720 | 630 | 500 | 470 | 560 | 400 | 680 | 450 | 500 |
| | Radiation resistance (760 kGy) | Tensile strength (MPa) | — | — | — | — | 13.0 | 10.1 | — | — | — | — |
| | | Elongation (%) | — | — | — | — | 160 | 180 | — | — | — | — |
| | Radiation resistance (2 MGy) | Tensile strength (MPa) | 7.4 | 7.0 | 6.9 | 7.3 | — | — | 25.5 | 15.3 | 20.0 | 20.1 |
| | | Elongation (%) | 150 | 180 | 150 | 110 | — | — | 100 | 130 | 160 | 150 |
| | Carcinogenicity | | Null | Null | Null | Null | Null | Null | Null | Null | Null | Null |
| | Bleed | | Null | Null | Null | Null | Null | Null | Null | Null | Null | Null |
| Judgment Passed: ○ Failed: X | | | ○ | ○ | ○ | ○ | ○ | ○ | ○ | ○ | ○ | ○ |

| | | | Comparative Examples | | | | | | |
|---|---|---|---|---|---|---|---|---|---|
| | | | 1 | 2 | 3 | 4 | 5 | 6 | 7 |
| Components | First component polymer | (1) Ethylene propylene rubber | 100 | 100 | | | | | |
| | | (2) Polychloroprene rubber | | | 100 | | | | |
| | | (3) Chlorosulfonated polyethylene | | | | 100 | 100 | 100 | |
| | Second component polymer | (4) Ethylene propylene rubber | | | | | | | 100 |
| | | (5) Chlorinated polyethylene | | | | | | | |
| | Process Oil | (6) Paraffinic oil | | | | | | 10 | |
| | | (7) Aromatic series oil | 10 | | | | | | |
| | | (8) TDAE | | 10 | 10 | 3 | 90 | | 10 |
| | Antioxidant | Amine antioxidant | 3 | 15 | 1 | 2 | 2 | 2 | 3 |
| | | Sulfur antioxidant | 5 | 20 | 0.5 | 2 | 2 | 2 | 5 |
| | Cross-linking agent | Dicumylperoxide | 3 | 3 | | | | | |
| | | Red lead | | | 30 | 30 | 30 | 30 | |
| | Filler | (9) Silica | | | | | | | |
| | | Carbon black | 40 | 40 | 40 | 40 | 40 | 40 | 40 |
| | Cross-linking accelerator | Thyraum accelerator | | | 3 | 3 | 3 | 3 | |
| Evaluation result | Tensile property (initial value) | Tensile strength (MPa) | 14.2 | — | 14.0 | 20.0 | 8.3 | 18.0 | — |
| | | Elongation (%) | 590 | >1000 | 570 | 360 | 900 | 500 | >1000 |
| | Radiation resistance (760 kGy) | Tensile strength (MPa) | — | — | Embrittle | — | — | — | — |
| | | Elongation (%) | — | — | Embrittle | — | — | — | — |
| | Radiation resistance (2 MGy) | Tensile strength (MPa) | 7.3 | — | — | Embrittle | — | 19 | — |
| | | Elongation (%) | 150 | — | — | Embrittle | — | 90 | — |
| | Carcinogenicity | | Present | Null | Null | Null | Null | Null | Null |
| | Bleed | | Null | Present | Null | Null | Present | Present | Null |
| Judgment Passed: ○ Failed: X | | | X | X | X | X | X | X | X* |

*Non-cross-linked
(1) EP51 (JSR Corporation) (EPDM),
(2) Showa Denko Chloroprene W (Showa Denko K.K),
(3) Hypalon 40 (DuPont Elastomers Inc.),
(4) EP11 (JSR Corporation) (EPM),
(5) Daisolac CM556 (Daiso Co., LTD.),
(6) Sunpar 115 (aniline point 106.9° C., CA 2%, CN 31%, CP 67%, PCA amount 3% or less) (Japan Sun Oil Co., Ltd.),
(7) AROMAX 1(aniline point 14.0° C., CA 46.5%, CN 33.0%, CP 20.5%, PCA amount 3% or less (IP 346 method))(Nippon Oil Corporation),
(8) TDAE (aniline point 74.5° C., CA 26.5%, CN 29.5%, CP 44%, PCA amount 3% or less (IP 346 method),
(9) Silane surface treated silica In Example 1, it is possible to obtain sufficient physical properties even after the radiation exposure by adding 10 parts by weight of TDAE and 8 parts by weight of antioxidant with respect to 100 parts by weight of EPDM (ethylene-propylene-diene copolymer).

As for Example 2 in which cross-linked EPDM and non-cross-linked EPM (ethylene-propylene copolymer) were blended, the better physical properties than Example 1 was obtained after the radiation exposure. In Example 2, 5 parts by weight of silica is added in order to prevent a decrease in the initial tensile strength due to the blending of non-cross-linked polymer.

The added amount of the antioxidant in Examples 3 and 4 is different from that in Example 1. The blending amounts of the antioxidant are each within the above-mentioned range, which satisfies the initial physical properties and the radiation resistance.

In Example 5, 10 parts by weight of TDAE and 4 parts by weight of antioxidant are added with respect to 100 parts by weight of blend polymer of cross-linked polychloroprene rubber and cross-linked chlorosulfonated polyethylene. Although the non-cross-linked polymer is not blended, it was possible to obtain the sufficient physical properties even after the radiation exposure by blending relatively radiation resistant chlorosulfonated polyethylene.

As for Example 6 in which cross-linked polychloroprene rubber and non-cross-linked chlorinated polyethylene were blended, the better physical properties than Example 5 was obtained after the radiation exposure. Silica is added for the same reason as Example 2.

The added amount of the TDAE is changed in Examples 7 and 8. The blending amounts of the TDAE are each within the above-mentioned range, which satisfies the initial physical properties and the radiation resistance.

In Examples 9 and 10, it was possible to obtain the sufficient physical properties even after the high-dose radiation exposure by adding 10 parts by weight of TDAE and 4 parts by weight of antioxidant with respect to 100 parts by weight of blend polymer of cross-linked chlorosulfonated polyethylene, non-cross-linked chlorinated polyethylene and non-cross-linked ethylene propylene rubber.

In contrast, although the physical properties equivalent to that of Example 1 can be obtained even after the radiation exposure in Comparative Example 1, since the used aromatic series oil contains many polycyclic aromatics and has high carcinogenicity, Comparative Example 1 was judged as "failed".

Since the added amount of the antioxidant is larger than 30 parts by weight in Comparative Example 2, the cross-link is not possible and the antioxidant is precipitated on the surface, thus, it is not suitable as a material. In Comparative Example 3, since the added amount of the antioxidant is less than 2 parts by weight, the deterioration after the radiation exposure was remarkable and it was not possible to obtain the sufficient physical properties.

In Comparative Example 4, since the added amount of TDAE is little such as 3 parts by weight, the embrittlement of the material occurred after the radiation exposure and it was not possible to obtain the sufficient physical properties. On the other hand, 90 parts by weigh of TDAE is added in Comparative Example 5. The bleed out intensively occurred at the time of the sheet formation, thus, it is not suitable as a material.

In Comparative Example 6, since the paraffinic oil having high aniline point is added, the compatibility with chlorosulfonated polyethylene is bad and the bleed out occurred, furthermore, since the aromatic ring content is small, it was not possible to obtain the sufficient physical properties after the radiation exposure.

Comparative Example 7 is an example of using only the non-cross-linked polymer. Since it is non-cross-linked, it elongated 1000% or more, furthermore, since the strength was weak, it is not suitable as a material.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A radiation resistant composition, comprising:

100 parts by weight of a polymer;

5 to 80 parts by weight of an aromatic series process oil that a polycyclic aromatic (PCA) extract by an IP 346 method (DMSO extraction) is not more than 3% and an aromatic compound content is not less than 20% by a Kurtz analysis; and a radiation resistance imparting agent, wherein the polymer comprises a first component polymer that comprises at least one cross-linked rubber and a second component polymer that comprises at least one non-cross-linked rubber.

2. The radiation resistant composition according to claim 1, wherein the aromatic series process oil comprises TDAE (treated distillate aromatics extracts) having an aniline point of not more than 90° C.

3. The radiation resistant composition according to claim 1, wherein the polymer comprises not less than 50 parts by weight to less than 100 parts by weight of the first component polymer, and not more than 50 and more than 0 parts by weight of the second component polymer.

4. The radiation resistant composition according to claim 1, wherein the radiation resistance imparting agent comprises 2 to 30 parts by weight of an antioxidant.

5. A radiation resistant composition, comprising:

100 parts by weight of a polymer;

5 to 80 parts by weight of an aromatic series process oil that a polycyclic aromatic (PCA) extract by an IP 346 method (DMSO extraction) is not more than 3% and an aromatic compound content is not less than 20% by a Kurtz analysis; and a radiation resistance imparting agent, wherein the polymer is cross-linked or vulcanized, wherein the polymer comprises 5 to 100 parts by weight of a first component polymer, and 50 to 0 parts by weight of a second component polymer, the first component polymer being cross-linked and the second component polymer being non-cross-linked, wherein the first component polymer comprises at least one of ethylene propylene rubber, polychloroprene rubber, chlorosulfonated polyethylene, chlorinated polyethylene and nitrile rubber, and wherein the second component polymer comprises at least one of ethylene propylene rubber, chlorosulfonated polyethylene and chlorinated polyethylene.

6. A radiation resistant composition, comprising:

100 parts by weight of a polymer;

5 to 80 parts by weight of an aromatic series process oil that a polycyclic aromatic (PCA) extract by an IP 346 method (DMSO extraction) is not more than 3% and an aromatic compound content is not less than 20% by a Kurtz analysis; and a radiation resistance imparting agent, wherein the polymer is cross-linked or vulcanized, wherein the radiation resistance imparting agent comprises 2 to 30 parts by weight of an antioxidant, wherein a first component polymer comprises at least one of ethylene propylene rubber, polychloroprene rubber, chlorosulfonated polyethylene, chlorinated polyethylene and nitrile rubber, and wherein a second component polymer comprises at least one of ethylene propylene rubber, chlorosulfonated polyethylene and chlorinated polyethylene.

7. A wire, comprising:

an insulation and/or a sheath material comprising the radiation resistant composition according to claim 1.

8. A cable, comprising:

an insulation and/or a sheath material comprising the radiation resistant composition according to claim 1.

9. The radiation resistant composition according to claim 2, wherein the polymer comprises not less than 50 and less than 100 parts by weight of the first component polymer, and not more than 50 and more than 0 parts by weight of the second component polymer.

10. The radiation resistant composition according to claim 3, wherein the polymer comprises not more than 70 parts by weight of the first component polymer.

11. The radiation resistant composition according to claim 10, wherein the polymer comprises not less than 30 parts by weight of the second component polymer.

* * * * *